(12) United States Patent
Carlson

(10) Patent No.: US 10,007,524 B2
(45) Date of Patent: Jun. 26, 2018

(54) MANAGING HISTORY INFORMATION FOR BRANCH PREDICTION

(71) Applicant: Cavium, Inc., San Jose, CA (US)

(72) Inventor: David Albert Carlson, Haslet, TX (US)

(73) Assignee: Cavium, Inc., San Jose, CA (US)

( * ) Notice: Subject to any disclaimer, the term of this patent is extended or adjusted under 35 U.S.C. 154(b) by 548 days.

(21) Appl. No.: 14/541,882

(22) Filed: Nov. 14, 2014

(65) Prior Publication Data

US 2016/0139932 A1    May 19, 2016

(51) Int. Cl.
*G06F 9/30*    (2018.01)
*G06F 9/38*    (2018.01)

(52) U.S. Cl.
CPC .......... *G06F 9/3844* (2013.01); *G06F 9/3851* (2013.01); *G06F 9/3859* (2013.01); *G06F 9/3875* (2013.01)

(58) Field of Classification Search
None
See application file for complete search history.

(56) References Cited

U.S. PATENT DOCUMENTS 5,926,634 A * 7/1999 Isaman ................ G06F 9/3844
712/239

OTHER PUBLICATIONS

Loh et al., "Exploiting Bias in the Hystgeresis Bit of 2-Bit Saturating Counters in Branch Predictors" Journal of Instruction-Level Parallelism 5: 1-32, 2003.
Skadron et al., "Speculative Updates of Local and Global Branch History: A Quantitative Analysis", pp. 1-23.

* cited by examiner

*Primary Examiner* — Corey S Faherty
(74) *Attorney, Agent, or Firm* — Occhiuti & Rohlicek LLP

(57) ABSTRACT

Branch history information characterizes results of branch instructions previously executed by a processor. A count is stored of a number of consecutive branch instructions previously executed by the processor whose results all indicate a not taken branch. In a first pipeline stage, a predicted branch result is provided based on at least a portion of the branch history information, and one or more of the branch history information, and the count, is updated based on the predicted branch result. In a second pipeline stage an actual branch result is provided based on an executed branch instruction, and the branch history information is updated based on the actual branch result. If the predicted branch result indicates a taken branch, the branch history information is updated based on the count, and if the predicted branch result indicates a not taken branch, the count is updated but not the branch history information.

32 Claims, 4 Drawing Sheets

MANAGING HISTORY INFORMATION FOR BRANCH PREDICTION

BACKGROUND

The invention relates to managing history information for branch prediction.

A processor pipeline includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a branch instruction to determine whether or not the branch will be taken. Finally, an instruction is committed, which may involve storing a result (e.g., in a write back (WB) stage or stages).

Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time). At the end of that block of instructions there may be a branch instruction that has a condition that is to be evaluated to yield a Boolean result. For example, a '0' result may indicate that the branch is not taken and the PC continues to advance sequentially to the next address in a current or subsequent block, and a '1' result may indicate that the branch is taken and the PC jumps (i.e., non-sequentially) to a starting address of a new block of instructions.

There are various situations in which it may be useful to speculatively fetch an instruction that is dependent on the result of a branch instruction before that result has actually been determined. Processor architectures that support such speculation use branch prediction to determine a "predicted branch result" that is used in early stages of the pipeline (e.g., to determine which instruction to fetch next), which may or may not agree with the "actual branch result" that will eventually be determined in a later stage of the pipeline. If the predicted branch result does not agree with the actual branch result, then the pipeline is flushed of any incorrect instructions and the correct instructions are fetched.

SUMMARY

In one aspect, in general, an apparatus includes: at least one processor executing instructions in a pipeline, the instructions including branch instructions; first storage for branch history information characterizing results of branch instructions previously executed by the processor; second storage for a count of a number of consecutive branch instructions previously executed by the processor whose results all indicate a not taken branch; first circuitry, in a first stage of the pipeline, configured to provide a predicted branch result based on at least a portion of the branch history information, and to update one or more of the branch history information, and the count, based on the predicted branch result; and second circuitry, in a second stage of the pipeline occurring later in the pipeline than the first stage, configured to provide an actual branch result based on an executed branch instruction, and to update the branch history information based on the actual branch result. The updating includes: if the predicted branch result indicates a taken branch, updating the branch history information based on the count, and if the predicted branch result indicates a not taken branch, updating the count but not updating the branch history information.

Aspects can include one or more of the following features.

The apparatus further includes third storage for branch prediction state information stored in each of multiple storage locations of a data structure.

The apparatus further includes third circuitry, in a third stage of the pipeline occurring earlier in the pipeline than the first stage, configured to determine an index value based on at least a portion of the branch history information, and based on at least a portion of a first pointer identifying the executed branch instruction.

The first circuitry is configured to provide the predicted branch result based on branch prediction state information from a storage location of the data structure corresponding to the index value.

The second circuitry is configured to provide the actual branch result based on the executed branch instruction identified by the first pointer, and to update one or more of the branch history information, and the branch prediction state information, based on the actual branch result.

The first circuitry is configured to provide the predicted branch result based on at least a portion of the branch history information, and to update one or more of the branch history information, and the count, based on the predicted branch result.

Determining the index value based on at least a portion of the branch history information, and based on at least a portion of a first pointer identifying the executed branch instruction includes: performing an exclusive-or operation on the branch history information and one or more portions of the first pointer.

The one or more portions of the first pointer comprise at least a first portion of the first pointer and a second portion of the first pointer, where the first portion and the second portion overlap.

The branch prediction state information stored in a particular storage location of the data structure comprises one or more bimodal predictors.

The branch prediction state information stored in a particular storage location of the data structure comprises multiple bimodal predictors.

Each bimodal predictor comprises a 2-bit saturating counter that includes two states corresponding to a predicted branch result indicating a taken branch, and two states corresponding to a predicted branch result indicating a not taken branch.

The second stage, or a stage occurring later in the pipeline than the second stage, includes circuitry configured to flush the pipeline in response to the actual branch result indicating a taken branch.

The updating includes, if the predicted branch result indicates a taken branch, updating the branch history information by shifting a sequence of bits by a number of bits that is based on the count to indicate branches not taken and shifting the sequence of bits by one bit to indicate a branch taken.

The updating includes, if the predicted branch result indicates a taken branch, resetting the count to zero.

The updating includes, if the predicted branch result indicates a not taken branch, updating the count by incrementing the count if the count is less than a threshold value.

The updating includes, if the predicted branch result indicates a not taken branch, updating the count by incrementing the count if the count is less than a threshold value.

The first storage comprises a register, and the branch history information comprises bits stored in the register corresponding to respective branch instructions, each bit having a first value if a predicted branch result of the respective branch instruction indicated a taken branch or having a second value if the predicted branch result of the respective branch instruction indicated a not taken branch.

In another aspect, in general, a method includes: executing instructions in a pipeline of at least one processor, the instructions including branch instructions; storing in a first storage, branch history information characterizing results of branch instructions previously executed by the processor; storing in a second storage, a count of a number of consecutive branch instructions previously executed by the processor whose results all indicate a not taken branch; providing from first circuitry, in a first stage of the pipeline, a predicted branch result based on at least a portion of the branch history information, and updating one or more of the branch history information, and the count, based on the predicted branch result; and providing from second circuitry, in a second stage of the pipeline occurring later in the pipeline than the first stage, an actual branch result based on an executed branch instruction, and updating the branch history information based on the actual branch result. The updating includes: if the predicted branch result indicates a taken branch, updating the branch history information based on the count, and if the predicted branch result indicates a not taken branch, updating the count but not updating the branch history information.

Aspects can include one or more of the following features.

The method further includes storing in a third storage branch prediction state information stored in each of multiple storage locations of a data structure.

The method further includes determining from third circuitry, in a third stage of the pipeline occurring earlier in the pipeline than the first stage, an index value based on at least a portion of the branch history information, and based on at least a portion of a first pointer identifying the executed branch instruction.

The method further includes providing from the first circuitry the predicted branch result based on branch prediction state information from a storage location of the data structure corresponding to the index value.

The method further includes providing from the second circuitry the actual branch result based on the executed branch instruction identified by the first pointer, and updating one or more of the branch history information, and the branch prediction state information, based on the actual branch result.

The method further includes providing from the first circuitry the predicted branch result based on at least a portion of the branch history information, and updating one or more of the branch history information, and the count, based on the predicted branch result.

Determining the index value based on at least a portion of the branch history information, and based on at least a portion of a first pointer identifying the executed branch instruction includes: performing an exclusive-or operation on the branch history information and one or more portions of the first pointer.

The one or more portions of the first pointer comprise at least a first portion of the first pointer and a second portion of the first pointer, where the first portion and the second portion overlap.

The branch prediction state information stored in a particular storage location of the data structure comprises one or more bimodal predictors.

The branch prediction state information stored in a particular storage location of the data structure comprises multiple bimodal predictors.

Each bimodal predictor comprises a 2-bit saturating counter that includes two states corresponding to a predicted branch result indicating a taken branch, and two states corresponding to a predicted branch result indicating a not taken branch.

The method further includes, from circuitry in the second stage, or a stage occurring later in the pipeline than the second stage, flushing the pipeline in response to the actual branch result indicating a taken branch.

The updating includes, if the predicted branch result indicates a taken branch, updating the branch history information by shifting a sequence of bits by a number of bits that is based on the count to indicate branches not taken and shifting the sequence of bits by one bit to indicate a branch taken.

The updating includes, if the predicted branch result indicates a taken branch, resetting the count to zero.

The updating includes, if the predicted branch result indicates a not taken branch, updating the count by incrementing the count if the count is less than a threshold value.

The updating includes, if the predicted branch result indicates a not taken branch, updating the count by incrementing the count if the count is less than a threshold value.

The branch history information comprises bits corresponding to respective branch instructions, each bit having a first value if a predicted branch result of the respective branch instruction indicated a taken branch or having a second value if the predicted branch result of the respective branch instruction indicated a not taken branch.

Aspects can have one or more of the following advantages.

An example of simple branch prediction involves selecting a 2-bit (2b) entry from a table, indexed by a hash of the PC. The 2b entry can be provided from a saturating counter encoding strongly not taken, weakly not taken, weakly taken, strongly taken (as described below with reference to FIG. 4). Branch prediction can be improved by incorporating the past behavior of previous branch instructions. This global branch history can be captured by shifting the not taken, taken status of all branch instructions into a global history shift register. The global history and the PC are then hashed to index into the table to retrieve the 2b entry from the saturating counters. The hash of the PC and global history shift register can be performed using an XOR operation, for example.

One potential issue that may be addressed using the techniques described herein is lack of determinism in the branch prediction procedure itself due changes in branch history that may occur while the branch prediction procedure is being performed, as described in more detail below. A principal problem caused by this indeterminism is difficulty in verification of the branch prediction procedure. Thus, removing this indeterminism can facilitate verification of the circuitry of a processor that uses this branch prediction procedure. The indeterminism may also lead to increased inaccuracies in the branch prediction. Reducing this source of inaccuracy of branch prediction can reduce frequency at which a speculative execution penalty due to misprediction of branch instructions must be paid.

Other features and advantages of the invention will become apparent from the following description, and from the claims.

DESCRIPTION

Figure 1:
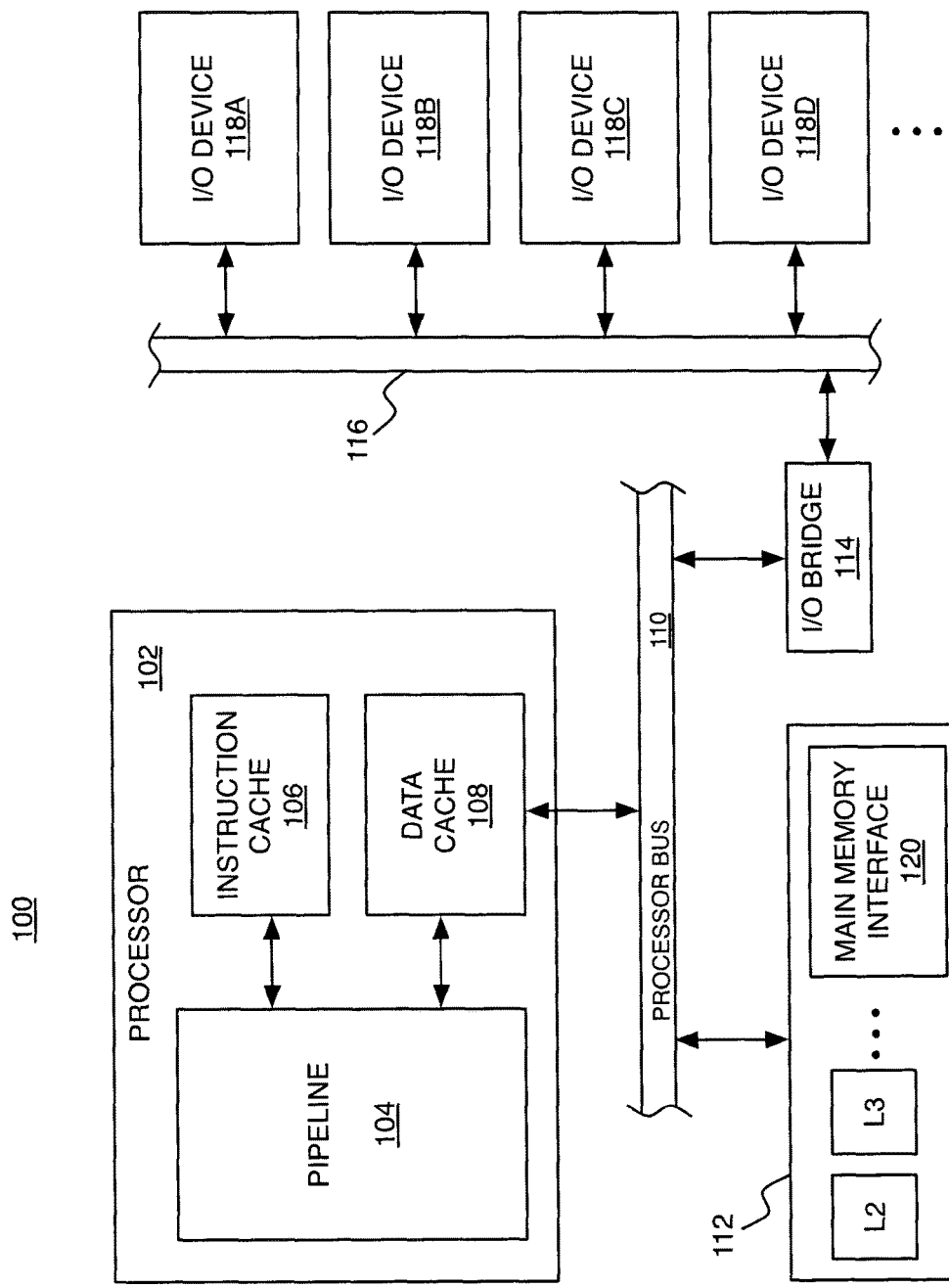
FIG. 1 is a schematic diagram of a computing system.

FIG. 1 shows an example of a computing system 100 in which the processors described herein could be used. The system 100 includes at least one processor 102, which could be a single central processing unit (CPU) or an arrangement of multiple processor cores of a multi-core architecture. In this example, the processor 102 includes a pipeline 104, an instruction cache 106, and a data cache 108 (and other circuitry, not shown). The processor 102 is connected to a processor bus 110, which enables communication with an external memory system 112 and an input/output (I/O) bridge 114. The I/O bridge 114 enables communication over an I/O bus 116, with various different I/O devices 118A-118D (e.g., disk controller, network interface, display adapter, and/or user input devices such as a keyboard or mouse).

The external memory system 112 is part of a hierarchical memory system that includes multi-level caches, including the first level (L1) instruction cache 106 and data cache 108, and any number of higher level (L2, L3, ...) caches within the external memory system 112. Other circuitry (not shown) in the processor 102 supporting the caches 106 and 108 includes a translation lookaside buffer (TLB), various other circuitry for handling a miss in the TLB or the caches 106 and 108. For example, the TLB is used to translate an address of an instruction being fetched or data being referenced from a virtual address to a physical address, and to determine whether a copy of that address is in the instruction cache 106 or data cache 108, respectively. If so, that instruction or data can be obtained from the L1 cache. If not, that miss is handled by miss circuitry so that it may be executed from the external memory system 112. Of course, this is only an example. The exact division between which level caches are within the processor 102 and which are in the external memory system 112 can be different in other examples. For example, an L1 cache and an L2 cache could both be internal and an L3 (and higher) cache could be external. The external memory system 112 also includes a main memory interface 120, which is connected to any number of memory modules (not shown) serving as main memory (e.g., Dynamic Random Access Memory modules).

Figure 2:
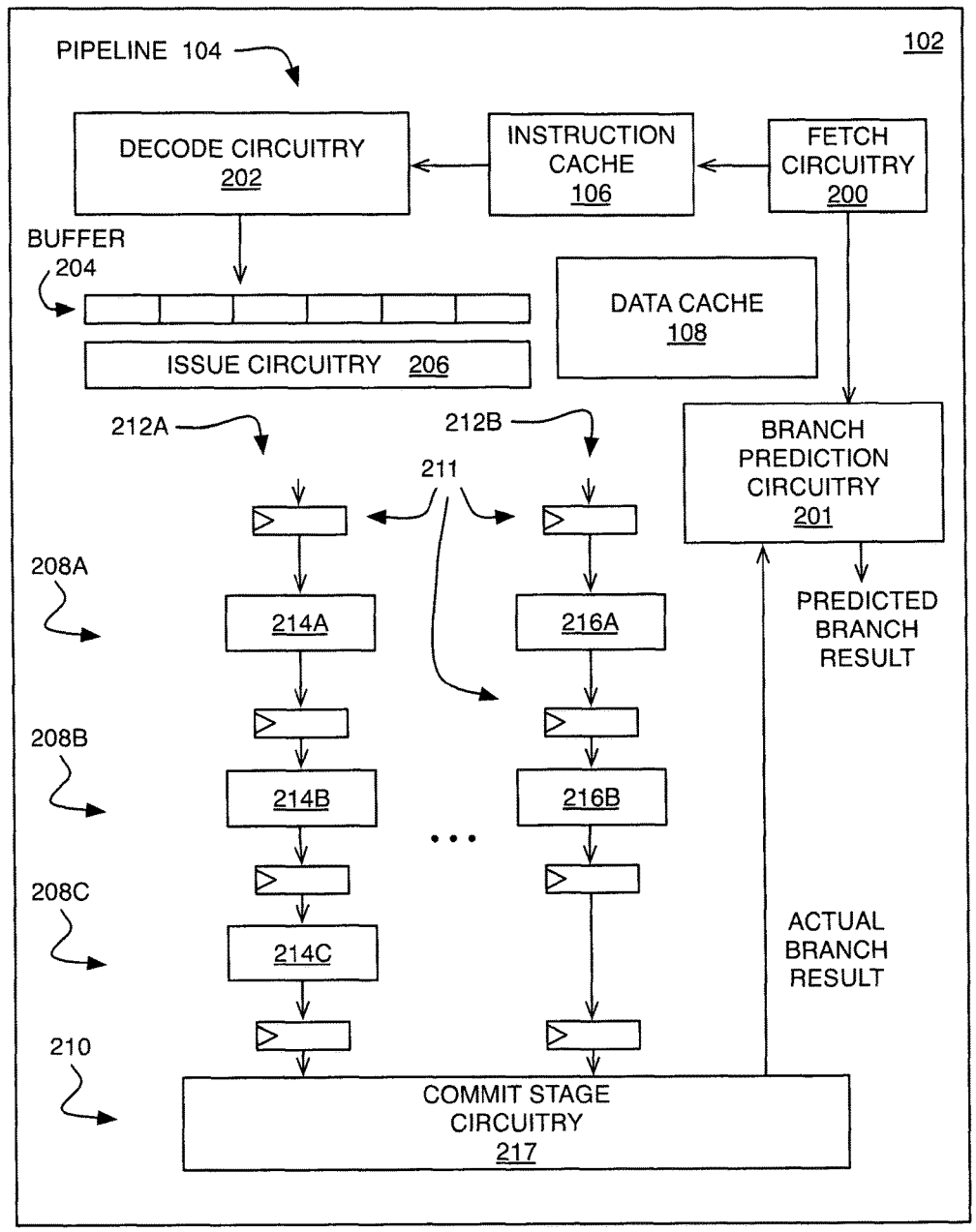
FIG. 2 is a schematic diagram of a processor.

FIG. 2 shows an example in which the processor 102 is a superscalar processor configured to use branch prediction for speculative execution of instructions. The processor 102 includes circuitry for the various stages of the pipeline 104. For one or more instruction fetch stages, instruction fetch circuitry 200 provides a program counter to the instruction cache 106 to fetch instructions to be fed into the pipeline 104. The fetch circuitry 200 also provides the program counter to branch prediction circuitry 201, which will be used to provide a predicted result for branch instructions, as described in more detail below. In some implementations, some or all of the branch prediction circuitry 201 is considered part of the fetch circuitry 200. For one or more instruction decode stages, instruction decode circuitry 202 stores information in a buffer 204 for instructions in the instruction window waiting to be issued.

Issue circuitry 206 determines in which cycle instructions in the buffer 204 are to be issued, which makes them available to progress through circuitry of the execution stages 208A, 208B, and 208C of the pipeline 104. (This example has three execution stages, but other examples may have more or fewer execution stages.) There is also at least one commit stage 210 that commits results of instructions that have made their way through the execution stages 208A, 208B, and 208C. For example, commit stage circuitry 217 may write back a result into a register file (not shown).

The instruction window includes instructions that have not yet issued (in the buffer 204), and instructions that have been issued but are still "in flight" and have not yet been committed. As instructions are issued, more instructions enter the instruction window by being stored in the buffer 204. Instructions leave the instruction window after they have been committed, but not necessarily in one-to-one correspondence with instructions that enter the instruction window. Therefore the size of the instruction window may vary. Instructions enter the instruction window in-order (i.e., according to a program order), and leave the instruction window in-order. But, in some implementations instructions may be issued and/or executed out-of-order.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture, but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216E located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include a units for various operations (e.g., ALU, multiplier, floating point unit), and another path may include circuitry for computing branch conditions for branch instructions, which provides an actual result of the branch instruction (e.g., 1: taken, 0: not taken) based on evaluating a branch condition for updating the branch prediction circuitry 201.

One effect that the branch prediction circuitry 201 has on the pipeline 104 is to cause a flush of certain stages of the pipeline under certain circumstances. In particular, there are two different circumstances in which a flush or partial flush may occur.

In an example of a first circumstance, after a branch condition has been evaluated and an actual branch result is determined during execution of a branch instruction, that actual branch result is compared with the predicted branch result that was previously provided from the branch prediction circuitry 201. If the predicted branch result matches the actual branch result, then the prediction was correct. However, if the predicted branch result does not match the actual branch result, then a misprediction occurred and all of the stages of the pipeline are flushed and the whole pipeline is restarted at the branch target instruction (if the actual branch result is 'taken'), or the fall-through instruction (if the actual branch result is 'not taken').

In an example of a second circumstance, there is a partial flush that may be required for just the earlier stages in the pipeline. The fetch circuitry 200 will typically send incrementing values of the PC to the instruction cache 106. After the instructions come back from the instruction cache and are decoded by the decode circuitry 202, the branch prediction circuitry 201 may output a predicted branch result that indicates a taken branch. At that point the previous two PC addresses sent to the instruction cache, in the two previous cycles, are incorrect because they were for instructions sequentially after the branch instruction and not for the branch target. The values in the pipeline stages corresponding to these two cycles of instructions coming from the instruction cache 106 will be discarded, but other values deeper in the pipeline 104 (corresponding to earlier instructions not affected by the predicted taken branch result).

Figure 3:
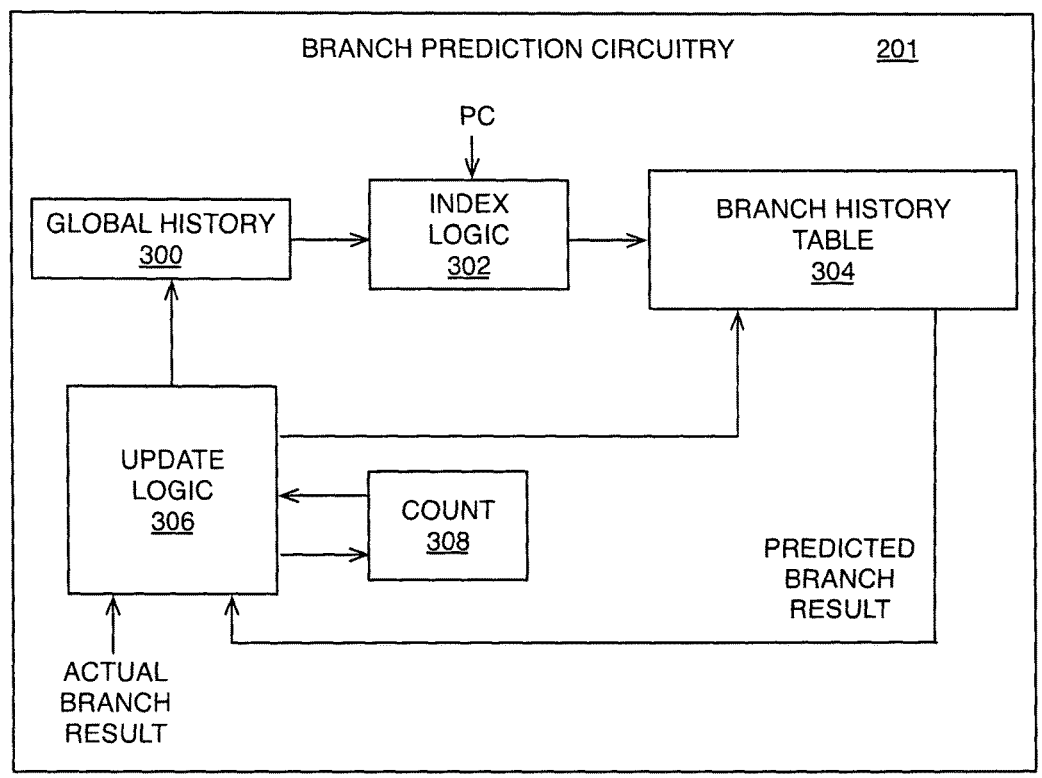
FIG. 3 is a schematic diagram of branch prediction circuitry.

FIG. 3 shows an example of branch prediction circuitry 201 configured to make accurate predictions for branch instructions in a deterministic manner. Global history storage 300 (e.g., shift registers) stores branch history information in the form of two versions of a global history (GH) bit vector representing a past history of branch results from the most recent series of branch instructions. One version is a speculative GH bit vector (sGH) stored in a shift register that is updated based on predicted branch results available at an early stage, and another version is a master GH bit vector (mGH) stored in a shift register that is updated based on actual branch results available at a late stage (e.g., actual branch results provided by commit stage circuitry 217). When a new bit value is shifted in to one of the GH bit vectors (a 1 representing a taken branch or a 0 representing a not taken branch), the oldest bit value will be shifted off the end. After a misprediction, the incorrect information in the speculative GH bit vector is corrected to reflect the information in the master GH bit vector.

Index logic 302 is configured to compute an index based on an operation that combines the speculative GH bit vector with certain bits of the PC (e.g., using exclusive OR (XOR) operations) to index into a branch history table 304. For example, the index may be computed as:

sGH XOR PC[22:12] XOR PC[15:3].

Each entry of the branch history table 304 (corresponding to a particular index) will store branch prediction state information for one or more instruction addresses. The branch prediction state information is used to determine a predicted branch result. For example, the branch prediction state information may include a 2-bit value of a bimodal predictor, such as the 2-bit saturating counter described below with reference to FIG. 4. States '10' or '11' indicate the branch should be predicted taken, and states '00' or '01' indicate the branch should be predicted not taken. After the actual branch condition is eventually evaluated, the actual taken/not taken branch result is known and the branch history table 304 can be updated.

A potential source of indeterminism in branch prediction occurs due to the number of cycles needed to read the branch history table 304 (e.g., 2 cycles are typically needed). This means that the index used to read the branch history table 304 may not have been computed based on the most up-to-date speculative GH bit vector, since one or more not taken branch results may have occurred between the time the index is known and the time the predicted branch result is determined. The reason it is only not taken results that introduce this potential source of indeterminism is because, if a taken branch had occurred, there would be a partial pipeline flush and a refetch at a new predicted instruction address. The indeterminism is caused because this pipeline delay in the prediction procedure itself can cause the same branch to get predicted differently even though the global history is the same.

The branch prediction circuitry 201 is configured to avoid this potential source of indeterminism by keeping track of the most recent string of not taken branches, but not immediately including them within the speculative GH bit vector. Delaying the incorporation of this piece of information can potentially reduce prediction accuracy, but helps to ensure determinism. In particular, the circuitry 201 includes update logic 306 that not only updates the speculative GH bit vector based on the predicted branch results, and the master GH bit vector and branch history table 304 based on the actual branch results, but also maintains a count 308 that controls the timing of the updates to the speculative GH bit vector. The count 308 stores a number of consecutive branch instructions previously executed by the processor 102 whose predicted results all indicate a not taken branch, since the last time the count 308 was reset to zero, up to a predetermined threshold.

If the predicted branch result indicates a taken branch, then the update logic 306 reads the current count 308 value COUNT and updates the speculative GH bit vector by shifting in COUNT '0' values and one '1' value. For example the speculative GH bit vector can be left shifted by COUNT+1 (shifting in '0' values) and then have its lowest order bit set to '1'. The count 308 is then reset (i.e., COUNT=0).

If the predicted branch result indicates a not taken branch, then the update logic 306 does not update the speculative GH bit vector, but instead only updates the count 308 using an update formula. For example, the update formula for the count 308 may be incremented with a threshold of THR, as follows:

COUNT=min(THR,COUNT+1)

where 'min(x, y)' is a function that takes the minimum of x and y. The value of THR should be at least as large as the number of cycles it takes to read the branch history table 304 (i.e., 2 in this example), but does not need to be much larger than that to provide both determinism and useful prediction performance. Eliminating the threshold (or setting it to a large value) would incorporate the predicted branch results within the speculative GH bit vector, but adequate performance can be achieved without having to provide space for a large counter within the branch prediction circuitry 201. A value of THR as low as 4 (stored in a 3-bit register), for example, may provide adequate performance.

The loss of prediction accuracy due to delaying incorporation of the most recent not taken branches into the speculative GH vector is worth the ability to facilitate verification of the branch prediction procedure in the context of verifying the design of an integrated circuit for the processor 102. In some embodiments, the reduction in prediction accuracy can be mitigated or removed. For example, reading multiple (e.g., 4 or 8) state variables (with predicted branch results) from the branch history table 304 for each index value (instead of one per index value) allows recent not taken bits to be considered. The PC hash bits not used to index the array (because 4 times as much data is being read, 2 less address bits are required), can be XORed with the low order bits of the not taken count. The result of this XOR is used to select 1 of 4 of the entries to read out. This method applies, for example, to reading 2, 4, 8, 16, entries, with better performance achieved the more entries that are read.

Figure 4:
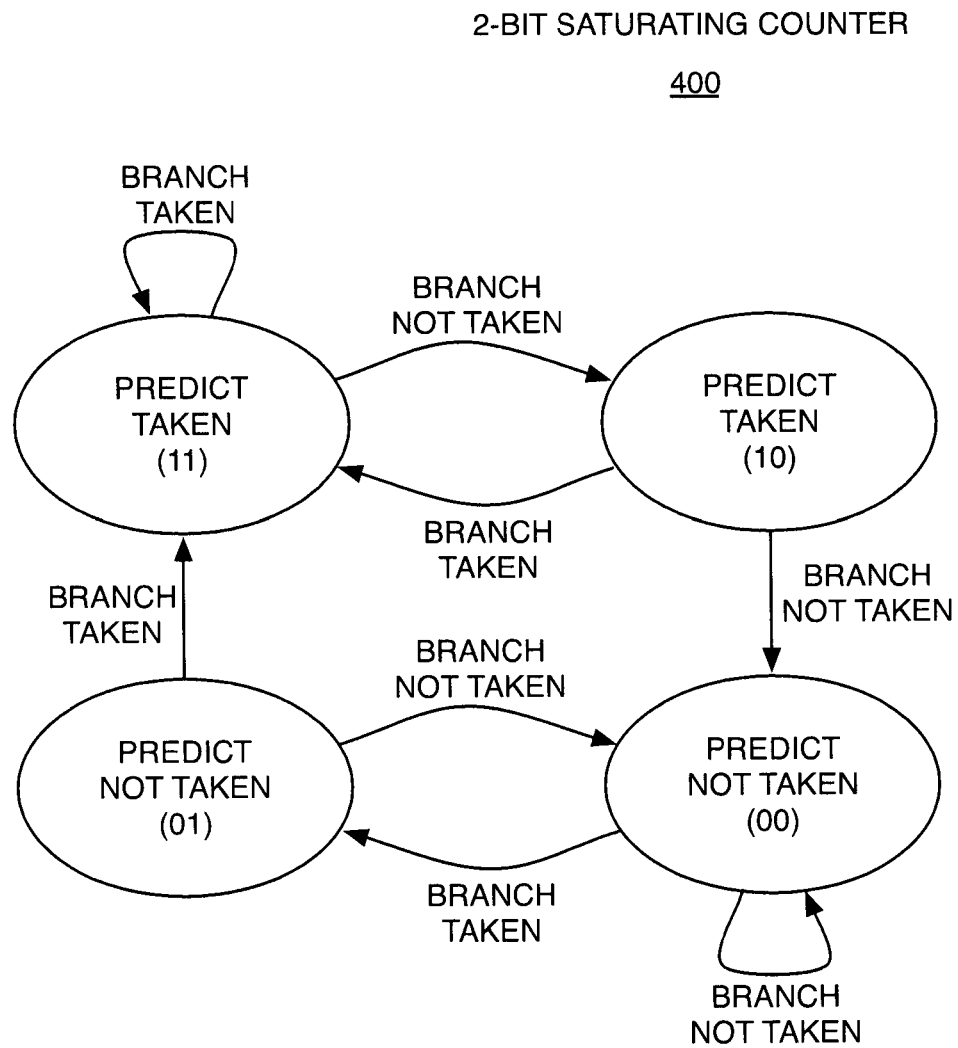
FIG. 4 is a state transition diagram for a 2-bit saturating counter.

FIG. 4 shows an example of a state transition diagram 400 for a 2-bit saturating counter. There are two values of the 2-bit state variable (10 and 11) that predict a taken result, and two values of the 2-bit state variable (10 and 00) that predict a not taken result. Based on the state transitions in the diagram 400, it can be seen that it takes two of the same actual branch results in a row to switch from predicting one result to predicting the other result. The states are also known as "strongly not taken" (00), "weakly not taken" (01), "strongly taken" (11), and "weakly taken" (10).

Other embodiments are within the scope of the following claims.

What is claimed is:

1. An apparatus comprising:
   at least one processor executing instructions in a pipeline, the instructions including branch instructions;
   first storage for branch history information characterizing results of branch instructions previously executed by the processor;
   second storage for a count of a number of consecutive branch instructions previously executed by the processor whose results all indicate a not taken branch;
   first circuitry, in a first stage of the pipeline, configured to provide a predicted branch result based on at least a portion of the branch history information, and to update one or more of the branch history information, and the count, based on the predicted branch result; and
   second circuitry, in a second stage of the pipeline occurring later in the pipeline than the first stage, configured to provide an actual branch result based on an executed branch instruction, and to update the branch history information based on the actual branch result,
   wherein the updating in the first stage includes:
      if the predicted branch result indicates a taken branch, updating the branch history information based on the count, and
      if the predicted branch result indicates a not taken branch, updating the count but not updating the branch history information.

2. The apparatus of claim 1, further comprising third storage for branch prediction state information stored in each of multiple storage locations of a data structure.

3. The apparatus of claim 2, further comprising third circuitry, in a third stage of the pipeline occurring earlier in the pipeline than the first stage, configured to determine an index value based on at least a portion of the branch history information, and based on at least a portion of a first pointer identifying the executed branch instruction.

4. The apparatus of claim 3, wherein the first circuitry is configured to provide the predicted branch result based on branch prediction state information from a storage location of the data structure corresponding to the index value.

5. The apparatus of claim 4, wherein the second circuitry is configured to provide the actual branch result based on the executed branch instruction identified by the first pointer, and to update one or more of the branch history information, and the branch prediction state information, based on the actual branch result.

6. The apparatus of claim 3, wherein determining the index value based on at least a portion of the branch history information, and based on at least a portion of a first pointer identifying the executed branch instruction includes: performing an exclusive-or operation on the branch history information and one or more portions of the first pointer.

7. The apparatus of claim 6, wherein the one or more portions of the first pointer comprise at least a first portion of the first pointer and a second portion of the first pointer, where the first portion and the second portion overlap.

8. The apparatus of claim 2, wherein the branch prediction state information stored in a particular storage location of the data structure comprises one or more bimodal predictors.

9. The apparatus of claim 8, wherein the branch prediction state information stored in a particular storage location of the data structure comprises multiple bimodal predictors.

10. The apparatus of claim 8, wherein each bimodal predictor comprises a 2-bit saturating counter that includes two states corresponding to a predicted branch result indicating a taken branch, and two states corresponding to a predicted branch result indicating a not taken branch.

11. The apparatus of claim 1, wherein the second stage, or a stage occurring later in the pipeline than the second stage, includes circuitry configured to flush the pipeline in response to the actual branch result indicating a taken branch.

12. The apparatus of claim 1, wherein the updating includes, if the predicted branch result indicates a taken branch, updating the branch history information by shifting a sequence of bits by a number of bits that is based on the count to indicate branches not taken and shifting the sequence of bits by one bit to indicate a branch taken.

13. The apparatus of claim 12, wherein the updating includes, if the predicted branch result indicates a taken branch, resetting the count to zero.

14. The apparatus of claim 12, wherein the updating includes, if the predicted branch result indicates a not taken branch, updating the count by incrementing the count if the count is less than a threshold value.

15. The apparatus of claim 1, wherein the updating includes, if the predicted branch result indicates a not taken branch, updating the count by incrementing the count if the count is less than a threshold value.

16. The apparatus of claim 1, wherein the first storage comprises a register, and the branch history information comprises bits stored in the register corresponding to respective branch instructions, each bit having a first value if a predicted branch result of the respective branch instruction indicated a taken branch or having a second value if the predicted branch result of the respective branch instruction indicated a not taken branch.

17. A method comprising:
   executing instructions in a pipeline of at least one processor, the instructions including branch instructions;

storing in a first storage, branch history information characterizing results of branch instructions previously executed by the processor;

storing in a second storage, a count of a number of consecutive branch instructions previously executed by the processor whose results all indicate a not taken branch;

providing from first circuitry, in a first stage of the pipeline, a predicted branch result based on at least a portion of the branch history information, and updating one or more of the branch history information, and the count, based on the predicted branch result; and providing from second circuitry, in a second stage of the pipeline occurring later in the pipeline than the first stage, an actual branch result based on an executed branch instruction, and updating the branch history information based on the actual branch result, wherein the updating in the first stage includes:
  if the predicted branch result indicates a taken branch, updating the branch history information based on the count, and
  if the predicted branch result indicates a not taken branch, updating the count but not updating the branch history information.

18. The method of claim 17, further comprising storing in a third storage branch prediction state information stored in each of multiple storage locations of a data structure.

19. The method of claim 18, further comprising determining from third circuitry, in a third stage of the pipeline occurring earlier in the pipeline than the first stage, an index value based on at least a portion of the branch history information, and based on at least a portion of a first pointer identifying the executed branch instruction.

20. The method of claim 19, further comprising providing from the first circuitry the predicted branch result based on branch prediction state information from a storage location of the data structure corresponding to the index value.

21. The method of claim 20, further comprising providing from the second circuitry the actual branch result based on the executed branch instruction identified by the first pointer, and updating one or more of the branch history information, and the branch prediction state information, based on the actual branch result.

22. The method of claim 19, wherein determining the index value based on at least a portion of the branch history information, and based on at least a portion of a first pointer identifying the executed branch instruction includes: performing an exclusive-or operation on the branch history information and one or more portions of the first pointer.

23. The method of claim 22, wherein the one or more portions of the first pointer comprise at least a first portion of the first pointer and a second portion of the first pointer, where the first portion and the second portion overlap.

24. The method of claim 18, wherein the branch prediction state information stored in a particular storage location of the data structure comprises one or more bimodal predictors.

25. The method of claim 24, wherein the branch prediction state information stored in a particular storage location of the data structure comprises multiple bimodal predictors.

26. The method of claim 24, wherein each bimodal predictor comprises a 2-bit saturating counter that includes two states corresponding to a predicted branch result indicating a taken branch, and two states corresponding to a predicted branch result indicating a not taken branch.

27. The method of claim 17, further including, from circuitry in the second stage, or a stage occurring later in the pipeline than the second stage, flushing the pipeline in response to the actual branch result indicating a taken branch.

28. The method of claim 17, wherein the updating includes, if the predicted branch result indicates a taken branch, updating the branch history information by shifting a sequence of bits by a number of bits that is based on the count to indicate branches not taken and shifting the sequence of bits by one bit to indicate a branch taken.

29. The method of claim 28, wherein the updating includes, if the predicted branch result indicates a taken branch, resetting the count to zero.

30. The method of claim 28, wherein the updating includes, if the predicted branch result indicates a not taken branch, updating the count by incrementing the count if the count is less than a threshold value.

31. The method of claim 17, wherein the updating includes, if the predicted branch result indicates a not taken branch, updating the count by incrementing the count if the count is less than a threshold value.

32. The method of claim 17, wherein the branch history information comprises bits corresponding to respective branch instructions, each bit having a first value if a predicted branch result of the respective branch instruction indicated a taken branch or having a second value if the predicted branch result of the respective branch instruction indicated a not taken branch.

* * * * *